(12) United States Patent
Konno

(10) Patent No.: US 6,379,126 B1
(45) Date of Patent: Apr. 30, 2002

(54) BLOWER

(75) Inventor: Mitsuo Konno, Kitasaku-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 09/571,865

(22) Filed: May 16, 2000

(30) Foreign Application Priority Data

Dec. 24, 1999 (JP) ............................................. 11-367528

(51) Int. Cl.[7] ................................................. F04B 17/00
(52) U.S. Cl. .................. 417/423.1; 417/354; 417/423.7
(58) Field of Search ............................ 417/423.1, 423.7, 417/354

(56) References Cited

U.S. PATENT DOCUMENTS 3,961,864 A * 6/1976 Papst et al. .................. 417/354
4,564,335 A * 1/1986 Harmsen et al. ............. 415/213
6,183,221 B1 * 2/2001 Hsieh ...................... 417/423.12

* cited by examiner

Primary Examiner—Michael Koczo
Assistant Examiner—William Rodriguez
(74) Attorney, Agent, or Firm—Oliff & Berridge PLC

(57) ABSTRACT

The invention enhances a joined portion between a bearing holder and a stator core in a blower. In the blower including a stator core attached to the outer circumference of a bearing holder, a setscrew for impeding the stator core from being pulled out is interposed between the bearing holder and the stator core. The setscrew is used for fixing in place of adhesives which is used in conventional art, ensuring the joining between the bearing holder and the stator core as well as facilitating the disassembling work.

6 Claims, 6 Drawing Sheets

BLOWER

BACKGROUND OF THE INVENTION

1. Field of the Invention

The present invention relates to an improved blower for use in a variety of OA (office automation) appliances.

2. Description of the Related Art

Each OA appliance houses many electronic circuits within its housing, so that heat generated by electronic parts constituting those electronic circuits is hard to be discharged. Because of this, there is a fear that some of the electronic parts are broken or deteriorated. Particularly in view of a recent trend towards downsizing of the OA appliance, in which the appliance is simply reduced in size despite an absence of reduction in quantity of the generated heat so much, countermeasures against the heat have come to an important technical object. Then troubles that would be caused by heat generated inside are prevented by forming a ventilation hole on a side wall of the appliance and mounting a blower around the hole to discharge internal heat to the outside of the appliance.

An example of the blower that has been frequently used will now be described with reference to a half-sectional view in FIG. 5. Reference symbol 1 denotes a casing that is cylindrical and functions as a wind tunnel. A housing 2 is formed integrally with this casing 1 at the center. A bearing holder 3 is formed in the housing's central portion. Outer races of bearings 4 and 5 are supported inside the bearing holder 3 and a shaft 6 is fitted and inserted to inner races of the bearings 4 and 5. A ring 7 is mounted at the lower end of the shaft 6 to thereby prevent the shaft 6 from being pulled out and to position the shaft 6 in the axial direction. A spring 8 is interposed between the bearings 4 and 5 in such a state where it is compressed to give the bearings 4 and 5 a force pulling them apart.

Reference symbol 9 denotes an impeller made of synthetic resins. This impeller 9 comprises a body 10 having in section a shape of letter L and blades 11 formed around the outer circumference of the body 10, which are integrally formed. When forming the impeller 9, a cup-shaped motor yoke 12 is placed inside the body 10, a zinc die-cast-made bush 13 attached to the shaft 6 is further put in the center of the motor yoke 12, and these are then integrated. The motor yoke 12 has a hole 12a with which a convex portion 10a of the body 10 is engaged. A ring-shaped magnet 14 is attached to the inner circumferential portion of the motor yoke 12. The shaft 6, the motor yoke 12, the impeller 9 and the magnet 14 together constitute a rotary part.

A stator core 16 around which a stator coil 15 is wound is arranged on the outside of the bearing holder 3 and the stator core 16 is fixed to the bearing holder 3 with adhesives to form a stationary part. A printed circuit board 17 on which electronic circuits composed of electric parts are installed as a brushless motor is mounted on a lower portion of the stator core 16. The electronic circuits incorporated into this printed circuit board 17 control electric current for rotating the rotary part relative to the stationary part. A pin-shaped connecting terminal 18 is projected downward from the stator core 16 to pierce through a part of the printed circuit board 17, thereby electrically connecting the stator coil 15 to the circuits on the printed circuit board 17.

The thus-constructed blower is used when mounted through the ventilation hole on the housing of the OA appliance. In the mounting work, the upper side of the blower in the drawing is directed to the outside of the housing of the OA appliance with the shaft 6 being directed in the horizontal direction. When a predetermined voltage is applied to a control circuit on the printed circuit board 17 under this state, the electric current controlled by the control circuit is caused to flow through the stator coil 15 so that the rotary part is rotated by a magnetic interference action between the magnetic flux generated in the stator core 16 and the magnetic flux generated by the magnet 14. The impeller 9 is rotated so that the air in the lower part of the housing in the drawing is sucked and is discharged toward the outside in the upper part in the drawing. With this air flow operation, the interior of the housing is cooled.

The blower formed as the above structure has no problem when used for cooling OA appliances. However, considering this structure from the view point of preservation of environment in the future, a portion where different kinds of materials are joined should be formed in such a manner that it can be easily disassembled upon disposal. The above-described structure does not meet this requirement because the bearing holder and the stator core are fixed to each other with adhesives, making disassembling work difficult.

SUMMARY OF THE INVENTION

The present invention has been made in view of the above, and an object of the present invention is therefore to provide a blower that is easy to be disassembled.

In order to attain the object above, according to a first aspect of the present invention, in a blower constructed by rotatably supporting a shaft with bearings arranged inside a bearing holder, rotatably fixing to the shaft a motor yoke, an impeller and a ring-shaped magnet to form a rotary part, arranging a stator core with a stator coil wound therearound in the inner circumferential portion of the magnet while providing a clearance which is supported by the outer circumferential portion of the bearing holder, it is characterized in that a setscrew for preventing the stator core from being pulled out is interposed between the bearing holder and the stator core. Incidentally, the "blower" referred to herein means an axial flow fan motor and a centrifugal fan motor, and the centrifugal fan motor further includes a cross-flow type and motor impellized type.

Also, according to a second aspect of the present invention, the blower in the first aspect of the invention is characterized in that the head of the setscrew is slotted.

Furthermore, according to a third aspect of the invention, the blower in the first aspect of the invention is characterized in that a hexagonal hole is formed in the head of the setscrew.

Furthermore, according to a fourth aspect of the present invention, the blower in the first aspect of the invention is characterized in that the setscrew is formed from a tapping screw.

Furthermore, according to a fifth aspect of the present invention, the blower in the first aspect of the invention is characterized in that one sheet of the stator core has a thickness of 0.35 mm to 0.5 mm, and in that the pitch of the setscrew coincides with the thickness of the stator core per sheet.

With the structure according to each aspect of the present invention, the stator core can be readily separated from the bearing holder by turning the setscrew and loosening the engagement.

DESCRIPTION OF THE PREFERRED EMBODIMENTS

Figure 1:
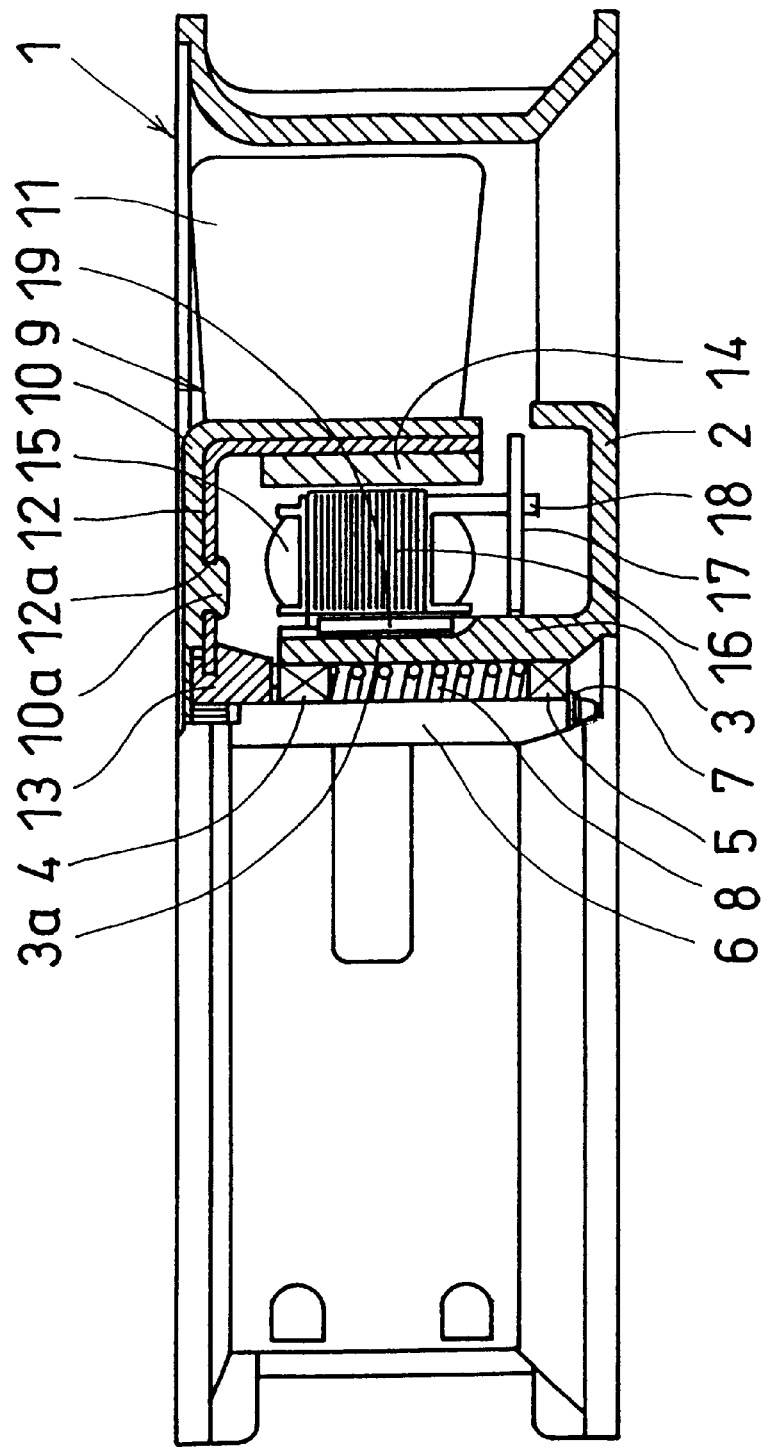
FIG. 1 is a half-sectional view of the blower according to an embodiment of the present invention, with a half thereof shown in section.

An embodiment of the present invention will now be described. In FIG. 1, reference symbol 1 denotes a casing that is cylindrical and functions as a wind tunnel. A housing 2 is formed integrally with this casing 1 at the center. A bearing holder 3 is formed in the housing's central portion. Outer races of bearings 4 and 5 are supported inside the bearing holder 3 and a shaft 6 is fitted and inserted to inner races of the bearings 4 and 5. A ring 7 is mounted at the lower end of the shaft 6 to thereby prevent the shaft 6 from being pulled out and to position the shaft 6 in the axial direction. A spring 8 is interposed between the bearings 4 and 5 in such a state where it is compressed to give the bearings 4 and 5 a force pulling them apart.

Reference symbol 9 denotes an impeller made of synthetic resins. This impeller 9 comprises a body 10 having in section a shape of letter L and blades 11 formed around the outer circumference of the body 10, which are integrally formed. When forming the impeller 9, a cup-shaped motor yoke 12 is placed inside the body 10, a zinc die-cast-made bush 13 attached to the shaft 6 is further put in the center of the motor yoke 12, and these are then integrated. The motor yoke 12 has a hole 12a with which a convex portion 10a of the body 10 is engaged. A ring-shaped magnet 14 is attached to the inner circumferential portion of the motor yoke 12. The shaft 6, the motor yoke 12, the impeller 9 and the magnet 14 together constitute a rotary part.

A stator core 16 around which a stator coil 15 wound is arranged on the outside of the bearing holder 3 and the stator core 16 is fixed to the bearing holder 3 with a setscrew 19 to form a stationary part. A printed circuit board 17 on which electronic circuits composed of electric parts are installed as a brushless motor is mounted on a lower portion of the stator core 16. The electronic circuits incorporated into this printed circuit board 17 control electric current for rotating the rotary part relative to the stationary part. A pin-shaped connecting terminal 18 is projected downward from the stator core 16 to pierce through a part of the printed circuit board 17, thereby electrically connecting the stator coil 15 to the circuits on the printed circuit board 17 as well as supporting the printed circuit board 17.

Figure 2:
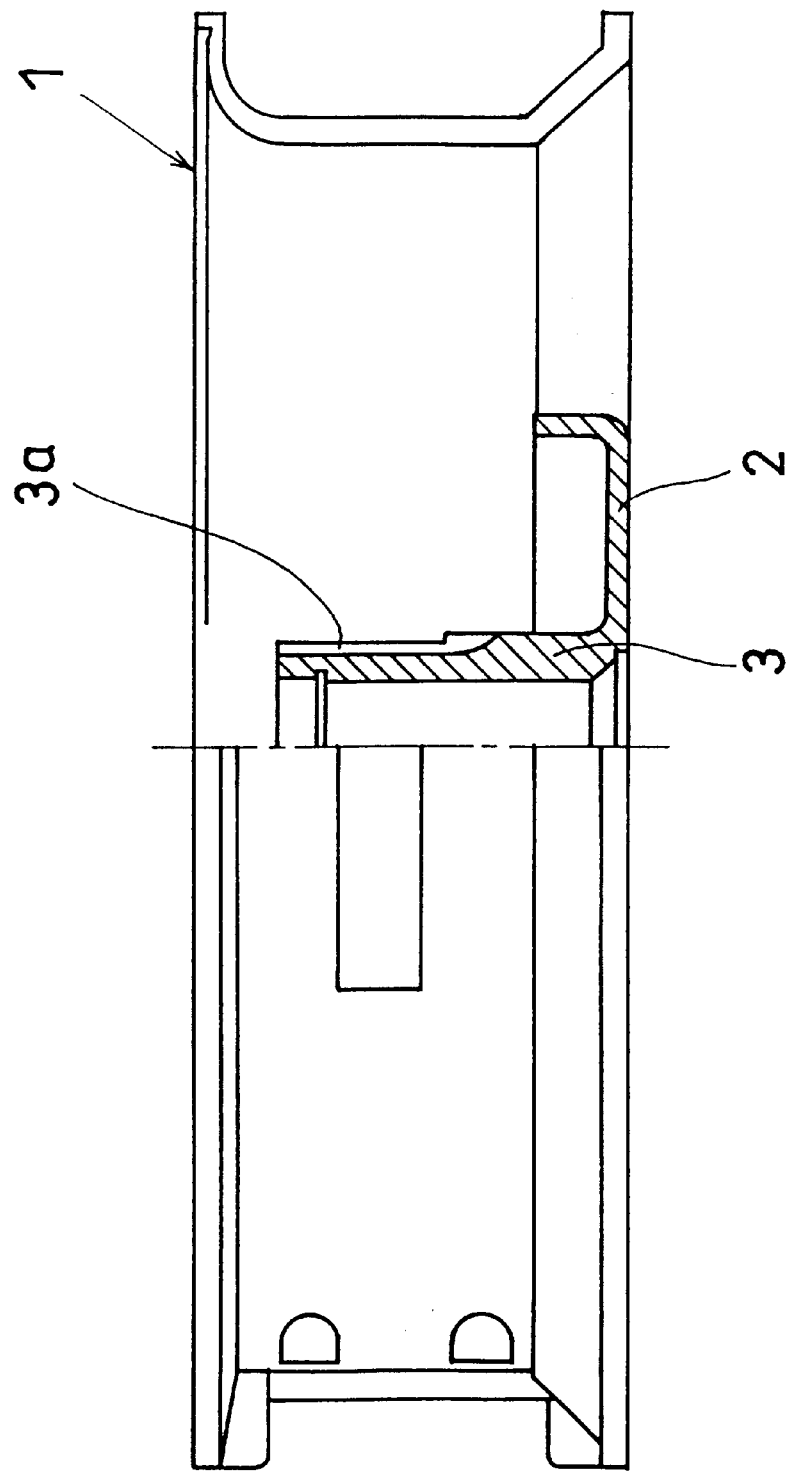
FIG. 2 is a half-sectional view showing only the casing and the bearing holder in FIG. 1.
Figure 3:
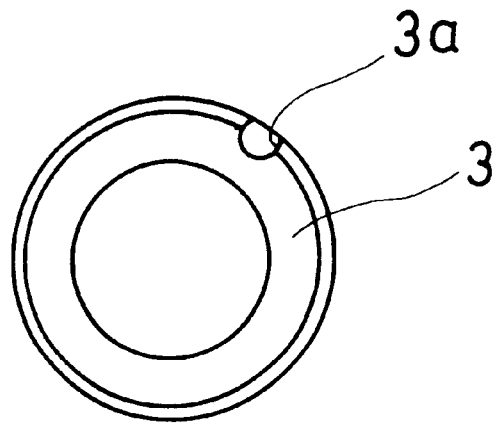
FIG. 3 is a plan view showing the bearing holder in FIG. 1.
Figure 4:
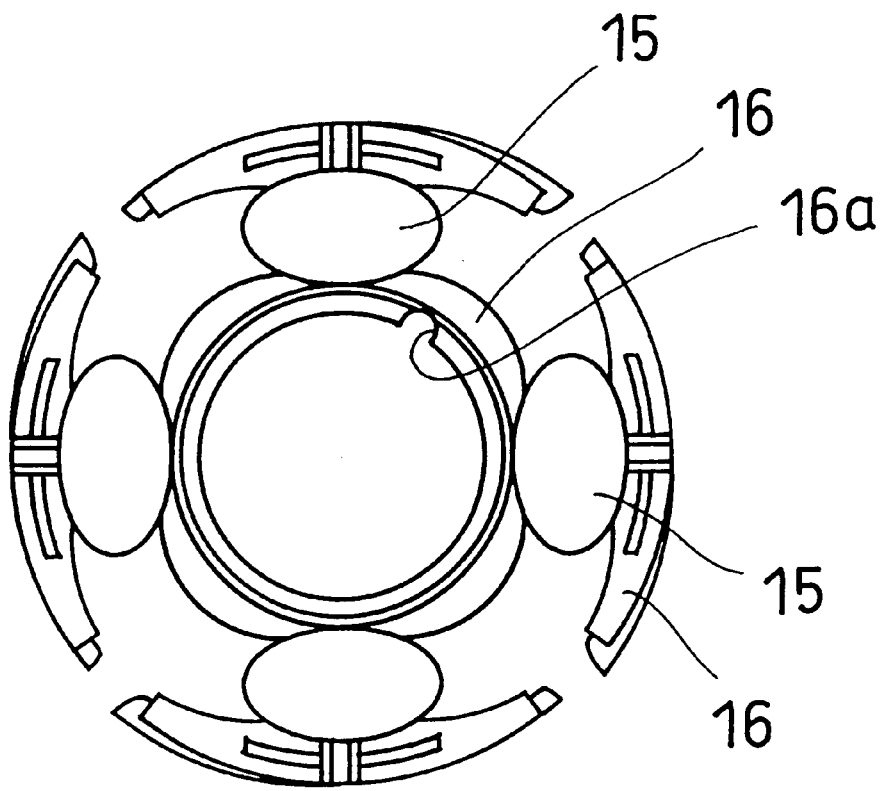
FIG. 4 is a plan view showing a stator core in FIG. 1.
Figure 5:
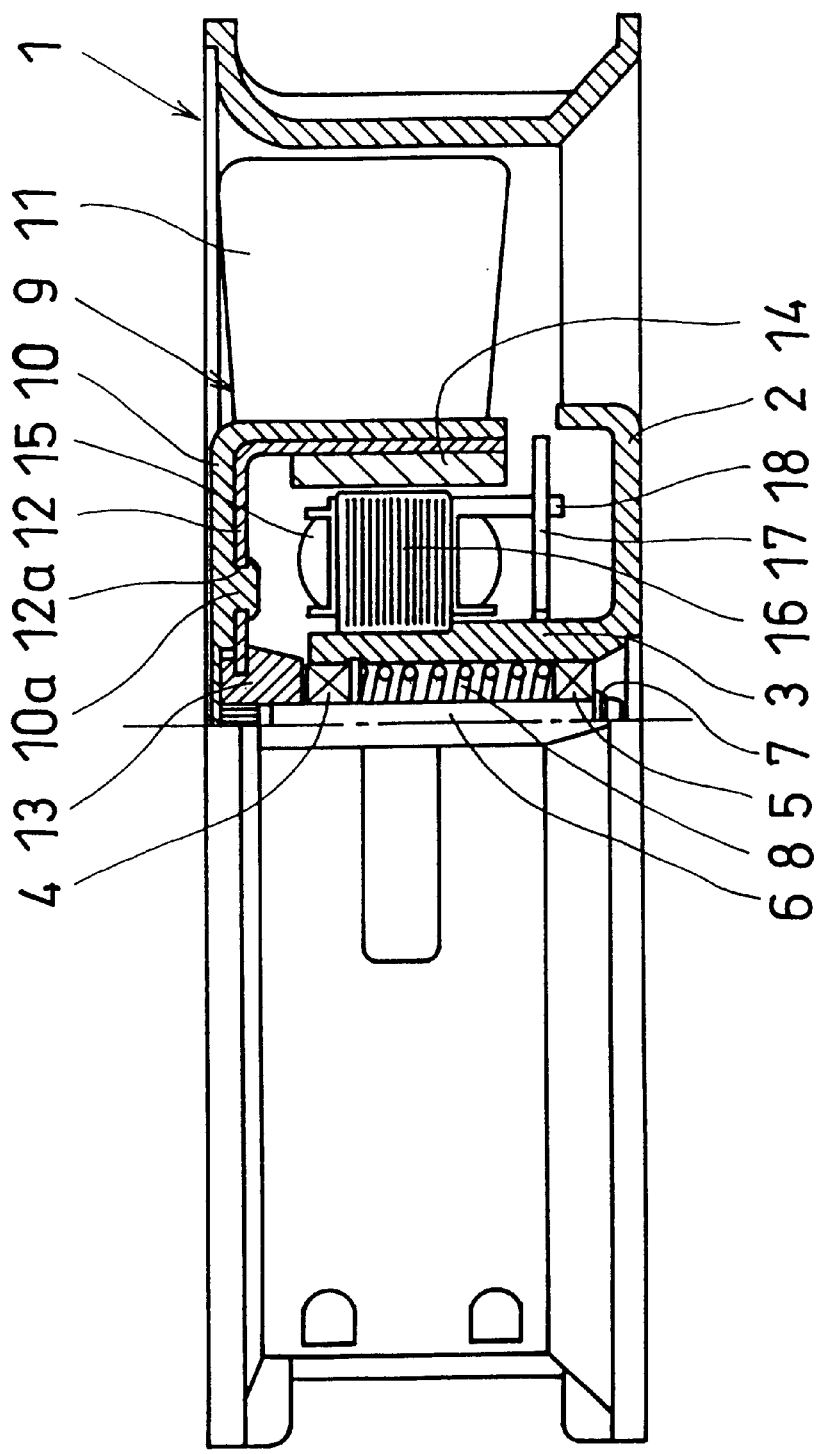
FIG. 5 is a half sectional view of the conventional blower with a half thereof shown in section.

FIG. 2 shows the casing 1 separately from other components shown in FIG. 1. As shown in FIG. 2, a groove 3a is formed on the outer circumferential portion of the bearing holder 3 from its top end to a certain depth. The plan view of this groove 3a is a semicircle as shown in FIG. 3. A groove 16a on the stator core 16 side which is opposed to this groove 3a is also semicircular as shown in FIG. 4. The setscrew 19 shown in FIG. 1 is interposed between the groove 3a and the groove 16a from above in FIG. 1.

If the head of the setscrew 19 is slotted, a normal flathead screwdriver can be used to screw the setscrew 19, making it easily to interpose the setscrew between the grooves 3a and 16a. Formation of a hexagonal hole in the head of the setscrew, instead of slotting the head, allows to use an Allen wrench that is bent to form a shape of letter L. If the setscrew 19 is formed not from a normal machine screw but from a tapping screw, the setscrew 19 may be prevented from falling out after interposed. In any of those cases, one sheet of the stator core 16 has a thickness of 0.35 mm to 0.5 mm and the pitch of the set screw coincides with the thickness of the stator core per sheet. This brings the thread of the setscrew 19 into an overlapped portion of the stator core 16, which also helps in preventing the setscrew from falling out.

The actual manufacture of the blower will be described. For conveniences in the manufacture, the radius of the groove 16a formed in the stator core 16 does not vary over its length from the uppermost portion down to the lowermost portion. On the other hand, the groove 3a of the bearing holder 3 is formed into a tapered shape by utilizing draft upon aluminum die-casting. With this pointed groove 3a, the setscrew 19 is screwed gradually increasing the degree of the engagement, so that the bearing holder and the stator core are more securely fixed with the screw. Incidentally, it may not be necessary to set the same radius in both of the groove 3a and the groove 16a.

When this axial flow fan motor is broken or to be disposed of, the stator core 16 is readily separated from the bearing holder 3 by loosening the engagement and removing the setscrew 19. Therefore, this facilitates separation according to type of materials.

In an example, the radius of the groove 16a formed in the stator core 16 is set to 1.5 mm, and the radius of the groove 3a formed in the bearing holder 3a is set to the same value. A hexagonally-holed setscrew of M3 (P=0.5) having a length of 10 mm is used as the setscrew, and is screwed in by about 6 kg-cm. In this condition, a shock of 1.000 G is applied at 5 times in total to the setscrew in a direction along which the screw is to be pulled out. Loosening of the engagement is not observed.

According to the embodiment described above, one groove is formed in each of the stator core 16 and the bearing holder 3, i.e., the groove 16a for the stator core and the groove 3a for the bearing holder, to interpose one setscrew between the groove 16a and the groove 3a. If several setscrews are used, the bearing holder and the stator core can be more securely fixed to each other. Instead of simply inserting the setscrew, the setscrew may be coated with an agent upon insertion for preventing the setscrew from being pulled out so as to enhance the effect of preventing pulling out of the screw.

Figure 6:
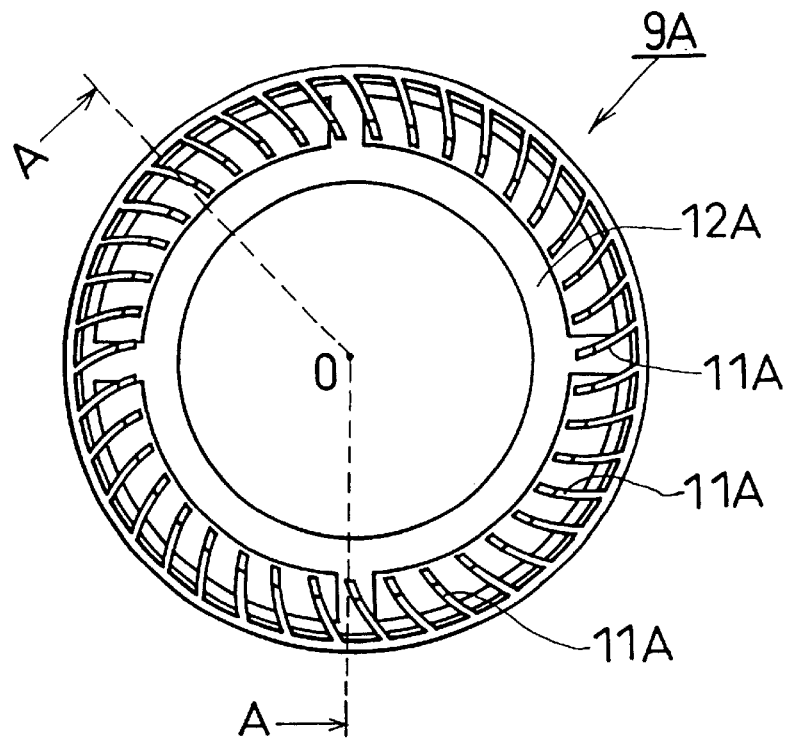
FIG. 6 is a frontal view separately showing the impeller that has a different structure.
Figure 7:
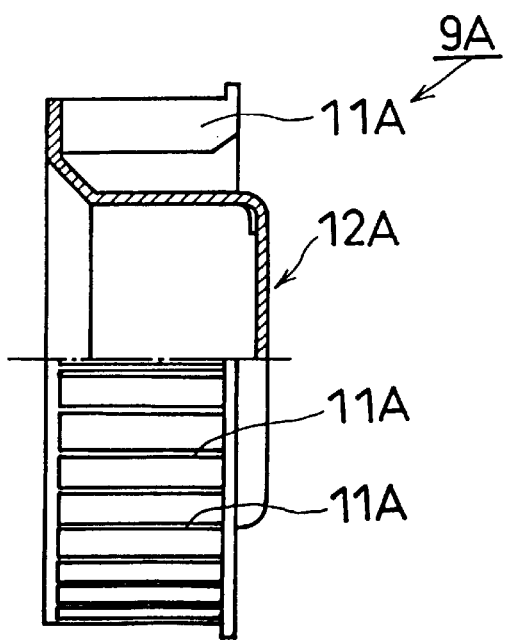
FIG. 7 is a diagram showing the half-sectional view and the side elevational view of a portion taken along the line O-A in FIG. 6.

The present invention may also be applied to a blower that uses an impeller having the structure different from the one described above. An example thereof will be described with reference to FIGS. 6 and 7. FIG. 6 shows the entirety of an impeller 9A and FIG. 7 is a half-sectional view showing a part of the impeller 9A taken along the line O-A in FIG. 6. This impeller 9A is provided with a number of arcuate blades 11A mounted radially on its body 12A.

Figure 8:
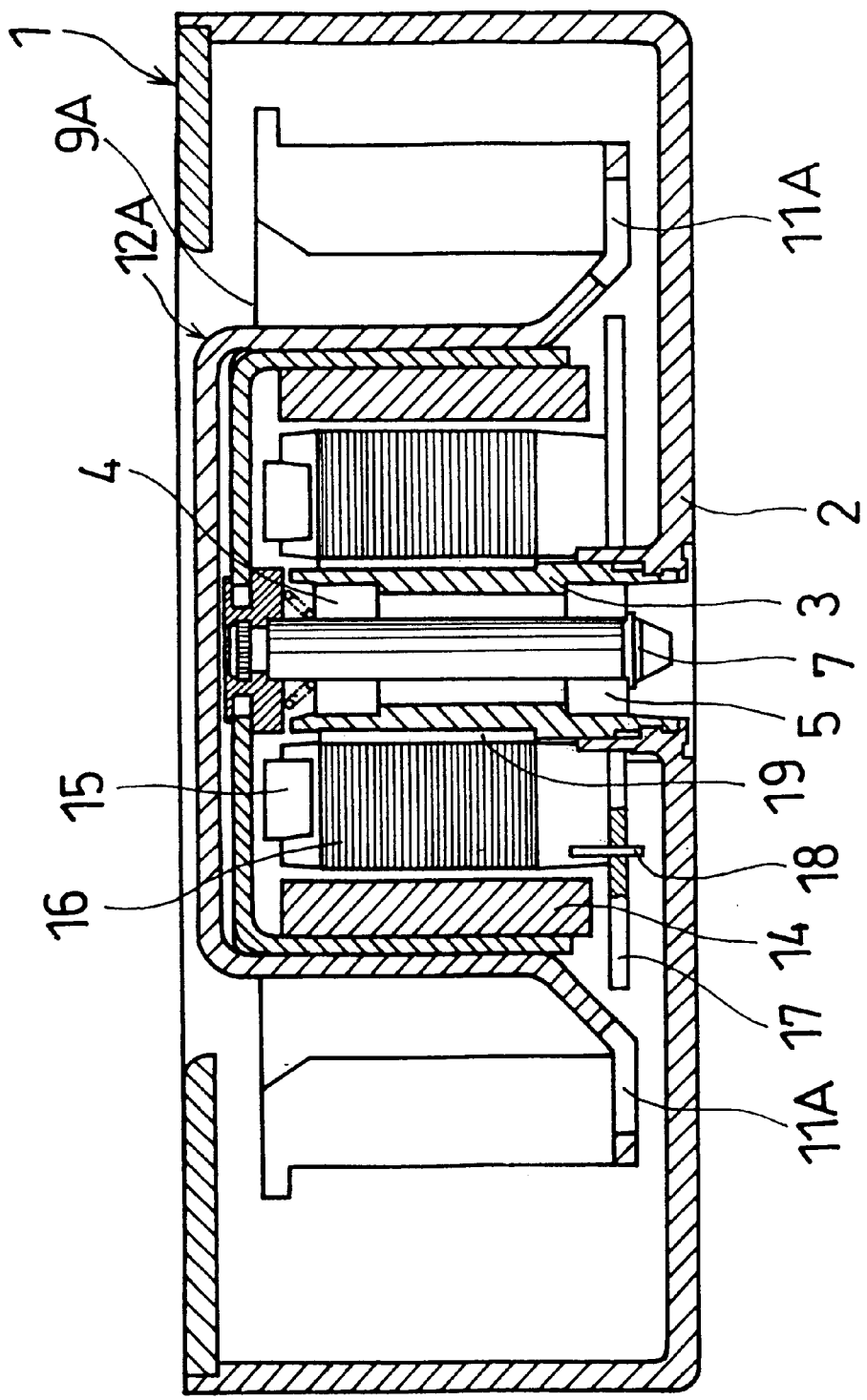
FIG. 8 is a longitudinal sectional view showing an embodiment in which the impeller shown in FIG. 6 is used.

FIG. 8 shows a blower using this impeller 9A. The same reference symbols as in FIG. 1 are used to indicate the like portions. In such an impeller also, the setscrew 19 for preventing the stator core 16 from being pulled out is interposed between the bearing holder 3 and the stator core 16. According to the present invention, the stator core 16 is securely fixed to the bearing holder 3 also in the blower having such structure.

The arrangement of the blower has been described above. Therefore, according to the first aspect of the invention, the fixing of the stator core to the bearing holder is carried out more securely and less costly. Also, the present invention facilitates the disassembling work at the time of disposal, which has been difficult because the stator core is fixed to the bearing holder with adhesives in conventional art. Therefore, separation according to type of materials becomes easy.

In this case, adoption of the structures according to the second to fifth aspects of the present invention makes the insertion and removal work of the setscrew easy, ensuring the fixing of the stator core to the bearing holder. In addition, the setscrew is readily removed upon disassembling.

What is claimed is:

1. A method of constructing a blower, comprising:

rotably supporting a shaft with bearings arranged inside a bearing holder;

rotably fixing the shaft to a motor yoke;

forming a rotary part including an impeller and a ring shaped magnet;

arranging a stator core having a stator coil in an inner circumferential portion of said magnet while providing a clearance that is supported by an outer circumferential portion of said bearing holder; and interposing a setscrew, between said bearing holder and said stator core, to impede said stator core from being separated from said bearing holder.

2. The method of constructing a blower according to claim 1, wherein the interposing step includes interposing a setscrew that has a slotted head.

3. The method of constructing a blower according to claim 1, wherein the interposing step includes interposing a setscrew that has a head with a hexagonal hole formed therein.

4. The method of constructing a blower according to claim 1, wherein the interposing step includes interposing a setscrew that is formed from a tapping screw.

5. The method for constructing a blower according to claim 1, wherein the arraying step includes arraying a stator core that is formed of a plurality of sheets, one sheet having a thickness of about 0.35 mm to about 0.5 mm, and a pitch of said setscrew is set to coincide with said sheet thickness.

6. A blower comprising:

a motor yoke;

a bearing holder including an outer circumferential portion;

a shaft with bearings arranged inside the bearing holder, the shaft rotably fixed to the motor yoke;

a rotary part including an impeller and a ring shaped magnet, the ring shaped magnet having an inner circumferential portion;

a stator core having a stator coil disposed in the liner circumferential portion of the magnet and defining a space between the stator core and the outer circumferential portion of the bearing holder; and a setcrew disposed between the bearing holder and the stator core, the setcrew impeding the stator core from being separated from the bearing holder.

* * * * *